A. H. DRAKE AND P. VANDEVEER.
WINDSHIELD MIRROR.
APPLICATION FILED JUNE 24, 1920.
1,362,856.
Patented Dec. 21, 1920.
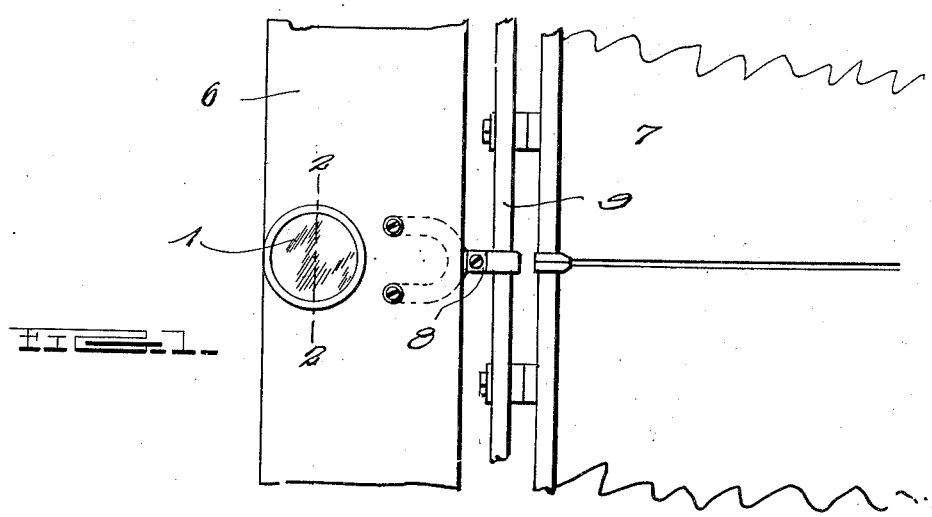
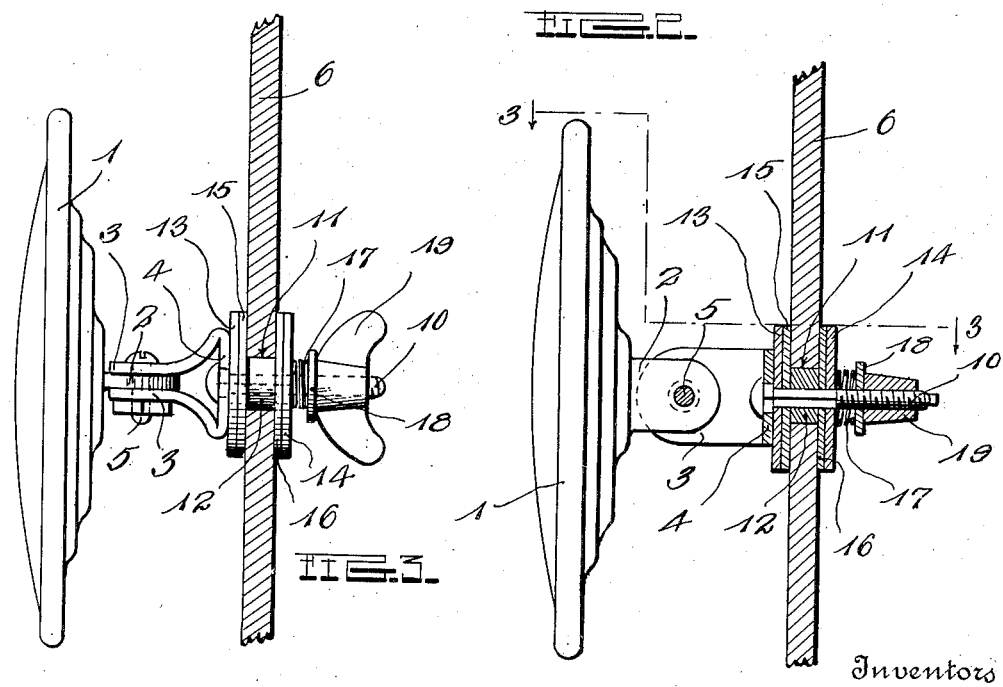
Witness
George H. Givaudyll
Inventors
Albert H. Drake
Perry Vandeveer
By H. R. Wilson & Co.
Attorneys

UNITED STATES PATENT OFFICE.

ALBERT H. DRAKE AND PERRY VANDEVEER, OF LOUISVILLE, KENTUCKY.

WINDSHIELD-MIRROR.

1,362,856.

Specification of Letters Patent. Patented Dec. 21, 1920.

Application filed June 24, 1920. Serial No. 391,306.

*To all whom it may concern:*

Be it known that we, ALBERT H. DRAKE and PERRY VANDEVEER, citizens of the United States, residing at Louisville, in the county of Jefferson and State of Kentucky, have invented certain new and useful Improvements in Windshield-Mirrors; and we do declare the following to be a full, clear, and exact description of the invention, such as will enable others skilled in the art to which it appertains to make and use the same.

This invention relates to an improved mirror for use in connection with a windshield, and one object of the invention is to provide a mirror so constructed that it may be connected with one of the side sections which are hingedly connected with the central portion of the windshield extending transversely across the front of the automobile, the mirror being connected with the side section by a bolt extending through an opening formed in the glass of the side section.

Another object of the invention is to so construct this mirror that it may be connected with the auxiliary side section of a windshield and when in place be positioned entirely within the area of the side section thus preventing the mirror from extending beyond the outer side of the auxiliary windshield section and preventing danger of the mirror being struck and knocked loose.

Another object of the invention is to so construct this mirror that when in place, it may have pivotal movement and also rotary movement and thus permit of the proper adjustment to obtain the desired reflection.

Another object of the invention is to so construct this mirror that a friction brake may be provided which will serve to retain the mirror in a set position after being adjusted.

Another object of the invention is to so construct this mirror that the plate of glass forming the side section may be very tightly clamped.

Another object of the invention is to provide a mirror for the purpose which will have a very simple construction but at the same time a very efficient construction.

This invention is illustrated in the accompanying drawings, wherein:

Figure 1 is a view in elevation showing the mirror connected with the side section of the windshield, Fig. 2 is a vertical sectional view taken along the line 2—2 of Fig. 1, portions of the device being shown in elevation, and Fig. 3 is a view taken along the line 3—3 of Fig. 2.

This mirror 1 is provided with a hinge ear 2 which extends from the center of its back and is secured between the arms 3 of the bearing bracket 4 by means of a pivot pin 5. It will thus be seen that the mirror may be swung upon the pivot pin 5. It is desired to connect the mirror with one of the side sections 6 of the windshield which is indicated in general by the numeral 7. Each of these side sections 6 is formed from a glass plate which is engaged by a bracket 8 which bracket engages one of the side bars 9 of the windshield and thus pivotally mount the glass plate or side section 6 so that it may be swung to a desired angle for shutting air from the driver's seat of the automobile. It has been customary to connect a mirror with a windshield by means of a bracket which engages the side bar 9 but in this connection the windshield is provided with pivotally mounted side sections and in order to connect the mirror with one of the side sections, there has been provided a pivot bolt 10 which is carried by the bracket 4 and extends through an opening 11 formed in the glass plate 6. A block 12 which will be formed of rubber, leather or any other suitable material, is placed upon the bolt 10 within the opening 11 and is held against rotation upon the bolt due to the fact that the bolt has its inner end portion squared as shown clearly in Fig. 2. Washers 13 and 14 which carry disks 15 and 16 of felt, rubber or any other suitable material, are placed upon the squared portion of the bolt 10 and a spring 17 is placed upon the bolt between the washer 14 and the washer 18 which is engaged by the nut 19 so that when the nut 19 is tightened, the spring will be compressed and the washers 13 and 14 will tightly grip the glass 6 and thus hold the mirror in engagement with the glass. The disks 15 and 16 in addition to preventing scratching of the glass will serve as frictional brake means which will prevent the mirror from having free rotary movement. Therefore, the mirror can be turned to a desired point and will remain in the adjusted position. It will thus be seen that the windshield section 6 may be swung to the desired position and the mirror then tilted and turned until it is in the proper position to reflect that portion of the roadway to the rear of the automobile and permit the driver to see other machines following along the road. It will be further seen that with this construction, the mirror will be entirely positioned within the area of the side section as shown in Fig. 1 and will not extend beyond the outer edge thereof. There will therefore be no danger of this mirror being struck and knocked loose or broken.

What is claimed is:

The combination with a windshield having an opening formed therein in spaced relation to its edge, of a rear view mirror positioned entirely within the confines of the windshield and having a hinge ear, a U-shaped bearing bracket having its arms pivotally connected with the hinge ear, a securing bolt carried by the bearing bracket and extending through the opening of the windshield, a bushing upon the bolt filling the opening in the windshield, washers upon the bolt engaging opposite faces of the windshield, a securing nut threaded upon the bolt, and a spring upon the bolt between the nut and one of the washers.

In testimony whereof we have hereunto set our hands.

ALBERT H. DRAKE.
PERRY VANDEVEER.